Patented Feb. 2, 1937

2,069,475

UNITED STATES PATENT OFFICE 2,069,475

DYESTUFFS OF THE GALLOCYANINE SERIES

Eugen Huber, Leverkusen-I. G. Werk, Germany, assignor to General Aniline Works, Inc., New York, N. Y., a corporation of Delaware No Drawing. Application April 7, 1933, Serial No. 665,042. In Germany April 14, 1932

5 Claims. (Cl. 260—28)

The present invention relates to new dyestuffs more particularly it relates to dyestuffs of the gallocyanine series which dyestuffs are characterized by containing as substituent at least once a sulfoalkylene group which is attached to an aromatic amino group of the gallocyanine dyestuff.

Our new dyestuffs may be represented by the probable general formula:

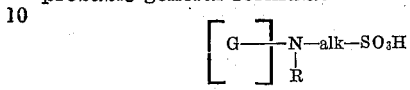

wherein "alk" stands for an alkylene group of at least 2 carbon atoms, "G" stands for the radical of a dyestuff of the gallocyanine series, "R" stands for hydrogen, alkyl, substituted alkyl, such as hydroxyalkyl, sulfoalkyl or for aralkyl, such as benzyl, chlorobenzyl, sulfobenzyl, and the like.

Our new dyestuffs are obtainable according to the usual method of preparing dyestuffs of the gallocyanine series by condensing gallic acid or a suitable derivative thereof, such as gallamide, a gallic acid arylamide, for instance, gallanilide, gallic acid esters, or also pyrogallic acid, with the nitroso compounds of a secondary or tertiary aromatic amine of the general formula:

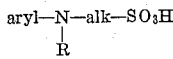

wherein "R" and "alk" mean the same as stated above.

The new dyestuffs thus obtained can be transformed into other derivatives according to the usual methods known in this series of dyestuffs; thus, for example, the carboxylic acid group can be split off. Further they can be reduced to form the leuco compounds, or condensed with aromatic mono- or diamines or the sulfonic acids thereof, or with aldehydes, phenols, naphthols or naphthol sulfonic acids. Further the new dyestuffs may be after-treated with sulfonating agents. I wish it to be understood that all these derivatives prepared from my new dyestuffs fall within the scope of my invention.

My new dyestuffs are distinguished by an excellent solubility in water and by clear shades and good fastness properties of the dyeings produced therewith; in view of their good solubility they are of especially high value for printing purposes.

The invention is illustrated by the following examples, without being limited thereto:

*Example 1.*—One molecular proportion of gallic acid is condensed at elevated temperature in the usual manner with 1½ molecular proportions of nitrosomethylphenyltaurine. The dyestuff thus obtained has in the free state the following formula:

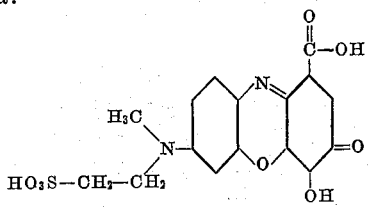

In form of its alkali metal salts it is a blackish powder, soluble in water with a reddish-blue coloration, in concentrated sulfuric acid with a clear corn-flower-blue coloration. When printed as chrome-lake, it yields more bluish, more even and fuller shades than gallocyanine (compare Colour Index, 1924, page 220, No. 883). Chromed wool is likewise dyed in more bluish shades.

Instead of methanol another suitable solvent may be used in the reaction, for instance, ethyl-alcohol or glacial acetic acid.

When heating the dyestuff in aqueous weakly alkaline solution the carboxylic acid group is split off.

*Example 2.*—One molecular proportion of pyrogallic acid is condensed with 1½ molecular proportions of nitrosomethylphenyltaurine as described in Example 1. The dyestuff obtained has in the free state probably the following formula:

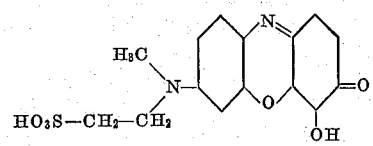

It dyes somewhat more reddish shades than the dyestuff of Example 1, paragraph 1, and has otherwise similar properties.

*Example 3.*—In an analogous manner as described in Example 1, gallamide is condensed with nitrosoethylphenyltaurine, yielding a dyestuff having in its free state the following formula:

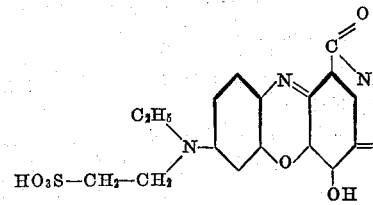

Compared with celestine blue B (see Colour Index, 1924, page 223, No. 900) it dyes more greenish shades. In dilute acids it is soluble with a red, in concentrated sulfuric acid with a cornflower-blue coloration.

*Example 4.*—One molecular proportion of gallamide is condensed in the usual manner with 1½ molecular proportions of nitroso-ortho-tolyltaurine in methanol as solvent. The dyestuff having in the free state the following formula:

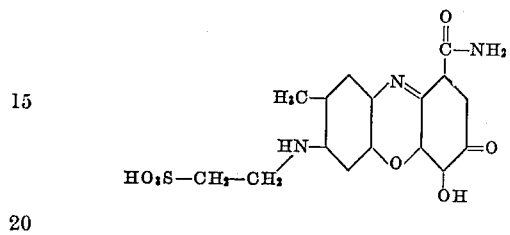

is soluble in concentrated sulfuric acid with a blue coloration. It forms dark colored alkali metal salts, which are soluble in water with a bluish-violet coloration.

*Example 5.*—Gallic acid is condensed in boiling methanol with 1½ molecular proportions of nitroso-di-(sulfoethyl)-aniline. The dyestuff of the following formula:

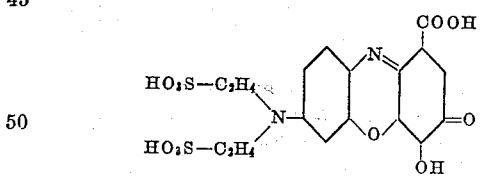

yields more bluish shades than gallocyanine, similar to the shades obtained with the dyestuff of Example 1, paragraph 1.

*Example 6.*—The dyestuff obtained in accordance with Example 3 is transformed into its leuco compound by the usual reduction with zinc dust and hydrochloric acid. The leuco dyestuff having in its free state the following formula:

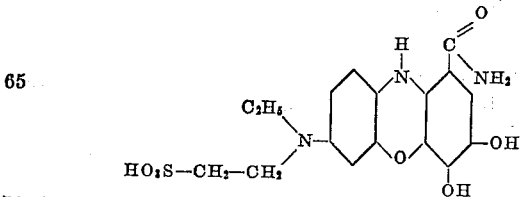

can be printed as chrome lake in solution or after previously isolating it.

*Example 7.*—The dyestuff obtained in accordance with Example 3 is transformed into the anilido compound by heating with aniline and with the addition of dinitrobenzene. The dyestuff corresponds in its free state to the following formula:

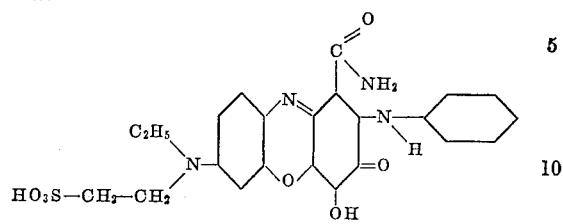

It is soluble in concentrated sulfuric acid with a red coloration and can be used for printing purposes, either directly or after sulfonating, whereby simultaneously a splitting off of the carboxylic acid amide group may be effected.

The sulfonated dyestuff corresponds in its free state to the following formula:

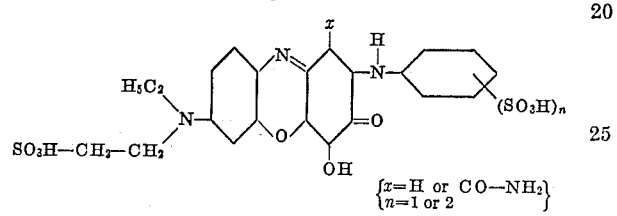

$\{x = H \text{ or } CO-NH_2\}$
$\{n = 1 \text{ or } 2\}$

*Example 8.*—The dyestuff prepared from one molecular proportion of gallamide and 1½ molecular proportions of nitrosomethylphenyltaurine is digested with p-amidodiethylaniline with the addition of some alcohol and dinitrobenzene, while heating until a test portion is soluble in concentrated sulfuric acid with a red coloration. In its free state the dyestuff corresponds to the following formula:

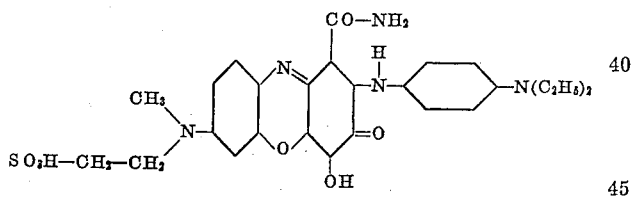

*Example 9.*—The dyestuff obtainable in accordance with Example 3 is condensed in hydrochloric acid solution with formaldehyde in the usual manner, until a test portion is soluble in water with a yellow coloration.

*Example 10.*—The dyestuff obtained in accordance with Example 3 is condensed in hydrochloric acid solution with resorcine, whereby there is formed a phenocyanine having in the free state the following formula:

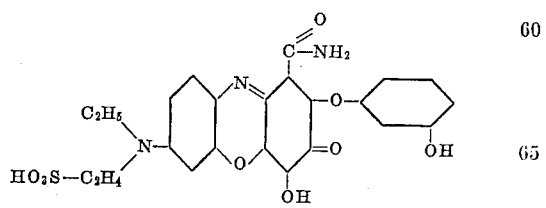

By boiling in aqueous caustic soda the carboxylic acid amide group is split off.

*Example 11.*—One molecular proportion of gallic acid is condensed with 1½ molecular proportions of nitrosobutylphenylaminopropane sulfonic acid in boiling methanol. The dyestuff obtained has in the free state the following formula:

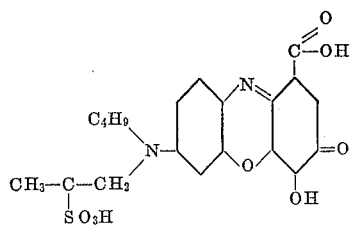

It is soluble in concentrated sulfuric acid and in water containing sodium acetate with blue colorations and yields, when printed as chrome lakes, more bluish shades than gallocyanine.

*Example 12.*—One molecular proportion of gallamide is condensed with 1½ molecular proportions of nitrosophenylbenzyltaurine in methanol as solvent. The dyestuff obtained having in its free state the following formula:

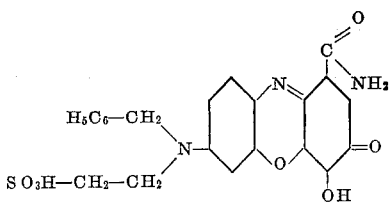

dyes somewhat more green shades than celestine blue B, and shows an increased solubility in water compared with this dyestuff. In dilute aqueous acids it is soluble with a red, in concentrated sulfuric acid with a clear blue coloration.

*Example 13.*—One molecular proportion of gallamide is condensed with 1½ molecular proportions of nitrosobutylphenylamino-β-oxypropane-γ-sulfonic acid in methanol as solvent. The dyestuff having in the free state the following formula:

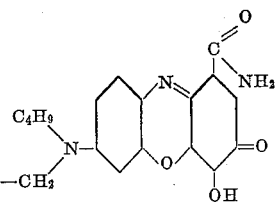

is soluble in dilute aqueous acids with a red, in concentrated sulfuric acid with a clear blue coloration and yields distinctly more greenish shades than celestine blue B.

I claim:

1. Gallocyanine dyestuffs of the general formula:

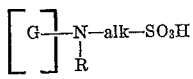

wherein "G" stands for the radical of a dyestuff of the gallocyanine series, "R" stands for a member of the group consisting of hydrogen, alkyl, sulfoalkyl and a radical of the benzyl series, and "alk" stands for an alkylene group of at least two carbon atoms, being in form of their alkali metal salts generally dark powders, soluble in water, and yielding clear shades of good fastness properties.

2. Gallocyanine dyestuffs of the general formula:

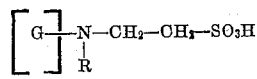

wherein "G" stands for the radical of a dyestuff of the gallocyanine series, "R" stands for a member of the group consisting of hydrogen, alkyl, sulfoalkyl and a radical of the benzyl series, being in form of their alkali metal salts generally dark powders, soluble in water, and yielding clear shades of good fastness properties.

3. Gallocyanine dyestuffs of the general formula:

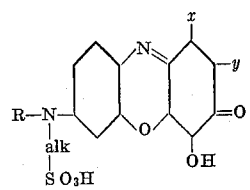

wherein "R" stands for a member of the group consisting of hydrogen, alkyl, sulfoalkyl and a radical of the benzyl series, "alk" stands for an alkylene group of at least two carbon atoms, "x" stands for a member of the group consisting of hydrogen, the carboxylic acid group and the carboxylic acid amide group, and "y" stands for a member of the group consisting of hydrogen, the group —NH—R' and the group —O.R', in which latter groups R' means a radical of the benzene series, being in form of their alkali metal salts generally dark powders, soluble in water and yielding clear shades of good fastness properties.

4. Gallocyanine dyestuffs of the general formula:

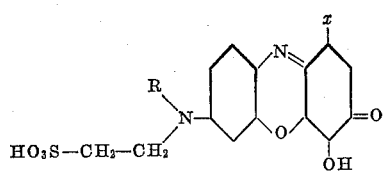

wherein "R" stands for alkyl from one to three carbon atoms, "x" stands for a member of the group consisting of hydrogen, the carboxylic acid group and the carboxylic acid amide group, being in form of their alkali metal salts generally dark powders, soluble in water, yielding clear shades of good fastness properties.

5. The gallocyanine dyestuff of the following formula:

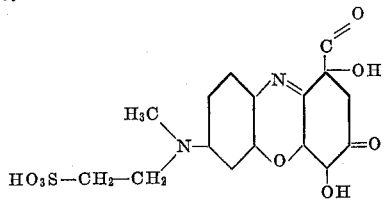

being in form of its alkali metal salts a blackish powder, soluble in water with a reddish-blue, and in concentrated sulfuric acid with a corn-flower-blue coloration.

EUGEN HUBER.